(12) United States Patent
Cheney, Jr. et al.

(10) Patent No.: US 7,377,956 B2
(45) Date of Patent: *May 27, 2008

(54) METHOD AND SYSTEM FOR PROCESSING NATURAL GAS USING A ROTARY SCREW COMPRESSOR

(75) Inventors: Richard P. Cheney, Jr., Aztec, NM (US); Brad Salzman, Farmington, NM (US)

(73) Assignee: RDC Research LLC, Farmington, NM (US)

( * ) Notice: Subject to any disclaimer, the term of this patent is extended or adjusted under 35 U.S.C. 154(b) by 354 days.

This patent is subject to a terminal disclaimer.

(21) Appl. No.: 11/183,277

(22) Filed: Jul. 15, 2005

(65) Prior Publication Data

US 2005/0268781 A1    Dec. 8, 2005

Related U.S. Application Data

(63) Continuation-in-part of application No. 10/859,044, filed on Jun. 2, 2004, now Pat. No. 6,955,705.

(51) Int. Cl.
*B01D 53/26* (2006.01)

(52) U.S. Cl. .............. 95/42; 60/902; 95/161; 95/169; 95/186; 95/187; 96/202; 96/218; 96/219; 418/201.1

(58) Field of Classification Search .......... 95/39–42, 95/161–169, 186–188, 260, 245–252, 263; 55/DIG. 17; 417/313; 60/902; 418/83, 418/85, 201.1; 96/181, 202–204, 218, 219

See application file for complete search history.

(56) References Cited

U.S. PATENT DOCUMENTS

| | | | |
|---|---|---|---|
| 2,225,959 A | 12/1940 | Miller | |
| 2,598,785 A | 6/1952 | Groebe et al. | |
| 2,663,669 A | 12/1953 | Barnes | |
| 3,182,434 A | 5/1965 | Fryar | |
| 3,254,473 A | 6/1966 | Fryar | |
| 3,535,057 A | 10/1970 | Kodra | |
| 3,824,766 A | 7/1974 | Valentine et al. | |
| 4,010,065 A | 3/1977 | Alleman | |
| 4,070,231 A | 1/1978 | Alleman | |

(Continued)

FOREIGN PATENT DOCUMENTS

JP    2-153285    6/1990

OTHER PUBLICATIONS

"Screw Compressors: A Comparison of Applications and Features to Conventional Types of Machines," 2000, J. Trent Bruce, Toromont Process Systems, Calgary, Alberta, Canada.

*Primary Examiner*—Richard L Chiesa
(74) *Attorney, Agent, or Firm*—Robert L. Waddell; Ted M. Anthony

(57) ABSTRACT

Method and system for processing natural gas containing contaminants through the use of one or more rotary screw compressors. A natural gas containing a contaminant (e.g., water or carbon dioxide and/or hydrogen sulfide) and a contaminant removing agent are combined and processed within a rotary screw compressor. The contaminant removing agent may be a dehydrating agent such as a glycol or a carbon dioxide and/or hydrogen sulfide removing agent such an amine. The method and system of the present invention also may employ a series of rotary screw compressors to process natural gas containing a plurality of contaminants.

22 Claims, 5 Drawing Sheets

U.S. PATENT DOCUMENTS

| | | |
|---|---|---|
| 5,084,074 A | 1/1992 | Beer et al. |
| 5,167,675 A | 12/1992 | Rhodes |
| 5,346,537 A | 9/1994 | Lowell |
| 5,453,114 A | 9/1995 | Ebeling |
| 5,490,873 A | 2/1996 | Behrens et al. |
| 5,536,303 A | 7/1996 | Ebeling |
| 5,766,313 A | 6/1998 | Heath |
| 6,004,380 A | 12/1999 | Landreau et al. |
| 6,128,919 A | 10/2000 | Daus et al. |
| 6,216,474 B1 | 4/2001 | Sishtla |
| 6,217,304 B1 | 4/2001 | Shaw |
| 6,238,461 B1 | 5/2001 | Heath |
| 6,266,952 B1 * | 7/2001 | Choroszylow et al. ........ 60/783 |
| 6,299,671 B1 | 10/2001 | Christensen |
| 6,301,898 B1 | 10/2001 | Choroszylow et al. |
| 6,364,933 B1 | 4/2002 | Heath |
| 6,461,413 B1 | 10/2002 | Landreau et al. |
| 6,500,241 B2 * | 12/2002 | Reddy ........................ 96/134 |
| 6,506,039 B1 | 1/2003 | Osumimoto et al. |
| 6,551,379 B2 | 4/2003 | Heath |
| 6,688,857 B1 | 2/2004 | Choroszylow et al. |
| 6,767,388 B2 | 7/2004 | Lecomte et al. |
| 6,843,836 B2 | 1/2005 | Kitchener |
| 6,955,705 B1 * | 10/2005 | Cheney et al. ................. 95/42 |
| 2002/0073843 A1 | 6/2002 | Heath |
| 2003/0037679 A1 * | 2/2003 | Kitchener .................... 96/270 |

\* cited by examiner

US 7,377,956 B2

METHOD AND SYSTEM FOR PROCESSING NATURAL GAS USING A ROTARY SCREW COMPRESSOR

CROSS REFERENCE TO RELATED APPLICATIONS

This application is a Continuation-In-Part of application Ser. No. 10/859,044, filed Jun. 2, 2004, now issued as U.S. Pat. No. 6,955,705.

FIELD OF THE INVENTION

The present invention relates to a method and system for processing natural gas containing a contaminant using a rotary screw compressor. More particularly, the present invention relates to a method and system for processing natural gas containing one or more contaminants using a rotary screw compressor that may be employed in a variety of facilities such as gas processing plants, pipeline treating stations, and industrial fuel gas scrubber facilities. In particular, the present invention relates to methods and systems for compressing and dehydrating wet natural gas produced from low-pressure wells, and more particularly, to methods and systems for compressing and dehydrating wet natural gas produced from low-pressure wells using rotary screw compression technology.

BACKGROUND OF THE INVENTION

Declining pressures in natural gas fields has resulted in the use of rotary screw compressors as wellhead boosters. Rotary screw compressors are designed for low pressure applications with inlet pressures up to 100 psig and discharge pressures up to 350 psig.

Rotary screw compressors are described in U.S. Letters Patent Nos. 6,506,039, 6,217,304, and 6,216,474, the disclosures of which are incorporated herein by reference. The main components include one set of male and female helically grooved rotors, a set of axial and radial bearings, and a slide valve, which are all encased in a common housing. As the rotors begin to un-mesh, the male rotor lobe will roll out of the female rotor flute. The volume vacated by the male rotor will fill with suction gas. The further un-meshing of the rotors results in an increase in the volume of gas filling the flute of each rotor.

Gas will continue to enter each flute until the rotor lobes roll out of mesh with each other. As they finish un-meshing, the flutes pass by the edge of the suction port which closes them off from the system. This is the point where the maximum volume of each flute occurs and represents the suction volume of the flute. The suction volume is the volume of trapped gas within the flute at the end of the suction process. The displacement of the rotary screw compressor can be determined by multiplying the volume of the input gas in the male and female flute by the number of lobes on the male rotor and then multiplying this figure by the rotor rpm.

The compression process begins once the suction process is over and the input volume established. The rotors continue to rotate and begin to mesh together along the bottom. The male rotor lobe moves into the female flute and reduces the volume in the flute. The compression process will continue until the compressed gas is discharged through the discharge port.

In an individual flute containing trapped gas, there are two lobe tips: one on the discharge side of the flute and one on the backside of the flute. The tip on the discharge side is referred to as the leading tip. The leading tip will be the first one to reach the discharge port. The second tip is called the trailing tip. As the leading tip of the rotor passes by the edge of the discharge port, the compression process is over and the gas will be forced into the discharge line. The discharge volume is the volume of trapped gas in the flute right before the leading tip of the rotor passes the discharge port. The discharge process continues until the male rotor lobe has completely rolled into the female flute, which displaces all of the gas and any lube oil remaining in the threads (lube oil may be injected into the rotary screw compressor to lubricate parts).

Rotary screw compressors typically have two discharge ports: an axial port and a radial port. The radial port is a V-shaped cut in the slide valve and the axial port is a butterfly shaped port machined in the end casing of the compressor between the bearing bores. Certain rotary screw compressors are designed to operate with lubrication. Those designed for lubrication require the addition of lube oil to provide sealing between rotor lobes and the casing and the male and female lobes where compression occurs. Lube oil is also required for lubrication of the bearings and shaft seals and to reduce the heat of compression in the compressor.

The lube oil system on a rotary screw compressor is a closed loop system. The oil is injected in several locations with the main oil injection port feeding the rotors directly and with smaller lines feeding other points for seals and bearings. Injected oil will drain to the rotors where it combines with the gas. The gas and oil mixture is discharged from the compressor. The gas and oil are separated from each other downstream.

A typical rotary screw compressor system is described in "Screw Compressors: A Comparison of Applications and Features to Conventional Types of Machines," J. Trent Bruce, Toromont Process Systems, Calgary, Alberta, Canada, and is depicted in FIG. 1, which illustrates a prior art flow diagram for natural gas screw compressor system 10.

As shown in FIG. 1, inlet line 11 feeds wet natural gas (gas containing water vapor) and other free liquid and solid contaminants to suction scrubber 12. Suction scrubber 12 removes the free liquid and solid contaminants from the wet natural gas. The contaminants are removed from suction scrubber 12 through drain/dump line 13 and thereafter disposed.

The wet natural gas is taken off the top of suction scrubber 12 and fed through line 14 to rotary screw compressor 15 where it mixes with the lubricating oil that is injected into rotary screw compressor 15 as described below. The lubricating oil is typically a synthetic product. Rotary screw compressor 15 compresses the wet natural gas. The compressed wet natural gas and lubricating oil mixture is discharged from rotary screw compressor 15 through line 16 to gas/oil separator 17.

Separator 17 separates the lubricating oil from the compressed wet natural gas. Typical oil carry over rates from separator 17 are in the 10 ppm range. The lubricating oil accumulates in the bottom of separator 17. The compressed wet natural gas (free of the lubricating oil) is discharged from separator 17 and is fed through line 18 to air cooler 19.

In air cooler 19, the compressed wet natural gas is cooled from normal discharge temperatures of 170-200° F. down to about 100° F. The cooled compressed wet natural gas is then fed from air cooler 19 through line 20 off skid for connection to the field piping and further processing. Such further processing may include removal of the water vapor entrained within the compressed natural gas by conventional dehydrating processes which are described below. Other contaminants may also need to be removed from the compressed natural gas, as for example, $CO_2$ and/or $H_2S$ contaminants. The compressed natural gas may also have to undergo sweetening processing.

The lubricating oil accumulated in the bottom of separator 17 is fed from separator 17 through line 21 to oil cooler 22. Oil cooler 22 cools the lubricating oil from a discharge temperature down to 140-160° F. To cool the lubricating oil, a conventional antifreeze composition (e.g., a water/glycol mixture) is pumped into one side of oil cooler 22 within line 27 and acts as a heat exchanger drawing out the heat in the lubricating oil. The antifreeze composition exits oil cooler 22 at line 28 where it is fed to pump 29. Pump 29 pumps the antifreeze composition through line 30 and into air cooler 19 which cools the antifreeze composition before sending it back through line 27 and into oil cooler 22.

The cooled lubricating oil is fed from oil cooler 22 through line 23 to rotary screw compressor 15 where it is injected into the rotors and reused as a lubricant. Line 24 diverts some of the cooled lubricating oil to oil filter 25 which filters the oil down to about 10 microns. The filtered oil is fed from oil filter 25 through line 26 to rotary screw compressor 15 where it is injected into the bearings and shaft seals and reused as a lubricant.

The compressed wet natural gas obtained after undergoing rotary screw compression still contains water vapor dispersed therein. This is likely because natural gas produced from low-pressure wells normally has large amounts of saturated water vapor entrained therein. The presence of water vapor in natural gas is problematic. Water vapor may cause corrosion, clogging, and other water related damage in the equipment storing or transporting the gas. Industry practice has been to remove the water vapor from the natural gas to prevent such problems.

The most common process for removing water vapor from natural gas is glycol dehydration. The process of glycol dehydration is described in U.S. Letters Patent Nos. 5,453,114, 6,004,380, 5,536,303, 5,167,675, 4,010,065, 5,766,313, and 6,238,461, the disclosures of which are incorporated herein by reference.

A conventional prior art glycol dehydration system 31 is illustrated in FIG. 2. The system includes absorption column 32 in which a wet gas stream is supplied via line 33 to absorption column 32 and passes upwardly through absorption column 32 and out of absorption column 32 via dried gas line 34. A dry glycol stream (lean absorbent) is fed to the upper portion of absorption column 32 via line 35 with a wet glycol stream (water and light aromatic hydrocarbon laden absorbent stream) being recovered from the lower portion of absorption column 32 and fed via line 36 to regenerator 37. A fuel gas stream is passed to regenerator 37 via line 40 and combusted in an amount sufficient to dry the wet glycol from line 36 to produce a lean absorbent stream which is fed through line 38 to pump 39 which pumps the lean absorbent stream to absorption column 32 via line 35. The fuel gas in line 40 is fed through control valve 41 which is regulated by a thermocouple (not shown) in operative contact, as demonstrated by line 42, with regenerator 37. Pump 39 is a gas-driven pump and is driven by the flow of fuel gas in line 40.

In regenerator 37 the water and light aromatic hydrocarbon containing solvent is dried. The water and light aromatic hydrocarbon vapors which were absorbed by the glycol are discharged to the atmosphere through vent line 44. The flue gas is discharged from regenerator 37 through line 42. The dried glycol is fed from regenerator 37 through line 38 to pump 39 and then back to absorption column 32 via line 35. Although not shown, the dried glycol stream exiting regenerator 37 may be passed through a cooler to cool the glycol stream before it is delivered to pump 39.

U.S. Letters Patent No. 6,688,857 describes a system for compressing natural gas that is used to fire a micro-turbine to produce electricity. The system uses a rotary positive displacement compressor to compress natural gas. A lubricating fluid, e.g., glycol or a glycol/water mixture, is fed to the compressor to effect lubrication. A separator separates the natural gas from the glycol fluid. The glycol fluid, which contains water absorbed therein, is processed in a dehydrator to remove the water. The glycol fluid may be cooled by a cooler disposed between the dehydrator and the compressor. The glycol fluid is returned to the compressor to lubricate, seal, and cool the compression process. The system differs from the present invention in that it uses a rotary displacement positive displacement compressor and not a rotary screw compressor. In addition, the system is primarily concerned with dehydrating the glycol/water lubricating fluid and not with dehydrating the natural gas. The system does not describe the operational connectivity between the engine for the compressor and a glycol pump nor the use of exhaust from the engine to provide a heating source for a reboiler.

As described above, low-pressure wells pose technical and economic problems in part due to their high-water content. As reservoir pressures continue to fall, the costs associated with dehydrating wet natural gas produced from these low-pressure make it economically unfeasible to produce natural gas. Standard dehydrating equipment has proven to be economically inefficient or unfeasible with lower pipeline and reservoir pressures. Operators are unwilling to produce natural gas from low-pressure wells because equipment costs required to produce and process the gas (e.g., dehydration) do not justify the potential return on their investment. Efforts have been made to overcome the problems associated with low-pressure wells by the use and/or development of new technologies. Despite these efforts, the need still exists to make low-pressure wells economically feasible to operate by reducing operational costs.

SUMMARY OF INVENTION

It is an object of the present invention to create greater efficiencies in low-pressure natural gas production by combining processes.

It is a further object of the present invention to create greater efficiencies in low-pressure natural gas production by eliminating certain dehydration equipment.

It is a further object of the present invention to create greater efficiencies in low-pressure natural gas production by reducing and conserving energy demand.

It is a further object of the present invention to create greater efficiencies in the processing of natural gas containing a contaminant that has applications in a variety of gas processing facilities.

The objects and advantages of the present invention are achieved by providing a novel method and system for compressing and dehydrating wet natural gas produced from a low-pressure well. In the method and system of the present invention, wet natural gas and a dehydrating agent are combined within a rotary screw compressor. Operation of the rotary screw compressor causes both compression and dehydration of the wet natural gas. By combining the processes of dehydration and compression, the method and system of the present invention achieve greater economic efficiencies.

These economic efficiencies are achieved by combining the process of gas compression and the process of dehydration into one process step. In accordance with the present invention, a rotary screw compressor is combined into a compressor and processing contactor for dehydration. The rotary screw compressor performs both the process of dehydration (combining the dehydrating agent with the wet natural gas) and the process of compressing the natural gas. By combining the processes of compression and dehydration into one process step using a rotary screw compressor, the present invention eliminates standard dehydrating equipment (e.g., glycol absorber) which equipment has increasingly become economically inefficient and unfeasible as reservoir pressures decline.

The present invention makes natural gas production from low-pressure wells economically feasible because the use of standard dehydrating equipment is no longer necessary. In addition, the design and operation of the rotary screw compressor, in particular the action of the twin helical rotors, provides increased efficiencies in the dehydration of wet natural gas by vigorous mixing coupled with the high rate of contact between the dehydrating agent and the water vapor entrained within the wet natural gas.

Other economies are achieved by the method and system of the present invention. In a preferred embodiment, the engine which powers the rotary screw compressor is used to power the dehydrating agent pump. In a further preferred embodiment, the engine exhaust produced by the engine which powers the rotary screw compressor and/or the dehydrating agent pump is fed to the reboiler. The reboiler uses the engine exhaust to remove water absorbed by the dehydrating agent in order to recover the dehydrating agent for re-circulation in the system. Thus, energy is conserved and savings obtained.

The method of the present invention involves feeding wet natural gas produced from a low-pressure well to a rotary screw compressor. A dehydrating agent is also fed to the rotary screw compressor and permitted to associate with the wet natural gas within the rotary screw compressor.

The dehydrating agent is preferably a glycol and more preferably, a glycol selected from the group consisting of diethylene glycol, triethylene glycol, tetraethlyene glycol, polyethylene glycol, polypropylene glycol, 1,3-butylene glycol, and hexylene glycol, and/or any combination thereof.

The addition of a glycol dehydrating agent to the screw compressor also serves a dual purpose. The glycol will act as a lubricant or lube oil to provide sealing between rotor lobes and the casing of the rotary screw compressor and between the male and female lobes of the rotors where compression occurs. The glycol lubricant will also provide lubrication for the bearings and shaft seals of the rotary screw compressor and reduce the heat of compression.

By using the glycol dehydrating agent as a lubricant or lube oil, the present invention eliminates the need for a closed-loop lubricating system which use synthetic lubricating oils. In comparison to glycol lubricants, synthetic lubricating oils are expensive and cost prohibitive. The present invention therefore further reduces operational costs and increases the economic efficiencies and feasibility of producing natural gas from low-pressure wells and pipelines.

During operation of the rotary screw compressor, the action of the rotors causes optimal mixing and contacting of the dehydrating agent with the wet natural gas. The dehydrating agent is thus able to absorb the water vapor from the wet natural gas which results in the processing of dry natural gas. Carrying out the dehydration process through the use of the rotary screw compressor has been found by the inventors herein to be an effective method of removing water vapor from wet natural gas making low-pressure gas dehydration possible and eliminating conventional dehydrating equipment. At the same time, the dry natural gas is compressed to produce a compressed dry natural gas thereby making the process efficient.

The rotary screw compressor may be operatively connected to and powered by an engine which may be an internal combustion engine driven by natural gas, electricity, or other driver. The operation of the rotary screw compressor produces a dehydrating agent/water mixture in a liquid phase and a compressed dry natural gas (natural gas substantially free of water vapor) in a gaseous phase. The combination (the dehydrating agent/water mixture and the compressed natural gas) is fed from the rotary screw compressor to a separator.

The dehydrating agent/water mixture and compressed dry natural gas are processed in the separator. The separator separates the liquid dehydrating agent/water mixture from the gaseous compressed dry natural gas.

The compressed dry natural gas is fed from the separator to a cooler. The compressed dry natural gas is processed in the cooler. The cooler cools the compressed dry natural gas. The cooled compressed dry natural gas is then fed from the cooler to a gathering system or sales line.

While the compressed natural gas is being fed from the separator to the cooler, the dehydrating agent/water mixture is fed from the separator to a reboiler. The dehydrating agent/water mixture is processed in the reboiler. The reboiler heats the dehydrating agent/water mixture to a temperature that causes vaporization of the water from the dehydrating agent/water mixture. This recovers the dehydrating agent for reuse.

The reboiler uses an energy source to heat the dehydrating agent/water mixture that is a product of other processes used in the method and system of the present invention. Energy resources are saved and operational costs reduced.

The reboiler acts as a heat exchanger. Engine exhaust produced by the engine is provided to the reboiler. In the reboiler, the heat from the exhaust is transferred to the dehydrating agent/water mixture which causes vaporization and removal of the water. This recovers the dehydrating agent for reuse in the system. The reboiler is preferably thermostatically controlled to divert the exhaust gas from the engine to the reboiler. The exhaust gas provides a sufficient heating source to meet the reboiler's requirement for an operating temperature of 275-300° F. By using engine exhaust as a heat source to recover the dehydrating agent, the present invention saves energy costs, is made more efficient, and increases economic feasibility of the production of low-pressure natural gas reservoirs.

The recovered dehydrating agent is re-circulated to the rotary screw compressor for re-use therein to absorb and dehydrate the wet natural gas continually being produced by the low-pressure well and fed to the rotary screw compressor. The recovered dehydrating agent must be processed before it can be fed back into the rotary screw compressor.

This procedure involves feeding the recovered dehydrating agent from the reboiler to a dehydrating agent pump. The dehydrating agent pump is operatively connected to and powered by the engine which provides the power source for the rotary screw compressor. Again, this conserves energy resources, which otherwise would be required to operate the dehydrating agent pump.

The dehydrating agent pump causes the recovered dehydrating agent to be fed from the pump to the cooler and ultimately back to the rotary screw compressor. The recovered dehydrating agent is processed in the cooler. The cooler cools the recovered dehydrating agent. After cooling the dehydrating agent is fed from the cooler to at least one dehydrating agent filter. The dehydrating agent filter acts to filter the cooled recovered dehydrating agent thus reducing the particle size thereof and removing particulate matter. The filtered cooled recovered dehydrating agent is fed from the dehydrating agent filter to the rotary screw compressor for reuse in the dehydration process.

Hydrocarbon production obtained from a wellhead of the low-pressure well may, in addition to the wet natural gas, include contaminants such as free liquids and/or solids. These free liquid and/or solid contaminants need to be separated from the wet natural gas before the wet natural gas is fed into the rotary screw compressor. Accordingly, the method of the present invention may involve the steps of feeding the hydrocarbon production to an inlet scrubber. The hydrocarbon production is processed in the inlet scrubber. The inlet scrubber separates the free liquid and/or solid contaminants from the wet natural gas.

The wet natural gas is then fed from the inlet scrubber to the rotary screw compressor where the same methods are carried out as described above to compress and dehydrate the natural gas.

The method of the present invention may also be used to process natural gas containing one or more contaminants. The method may be employed in a variety of facilities where natural gas is processed by contact, preferably, with a liquid. For example, the method of the present invention may be used in gas processing plants, pipeline treating stations, or industrial fuel gas scrubber facilities.

The method of processing a natural gas containing a contaminant starts with feeding the natural gas containing the contaminant into a rotary screw compressor. A contaminant removing agent is also fed into the rotary screw compressor. Operation of the rotary screw compressor (vis-a-vis the action of the rotors) causes the natural gas containing the contaminant and the contaminant removing agent to interact, mix, and associate resulting in a combination of a contaminant removing agent/contaminant mixture in a liquid phase and a compressed and processed natural gas in a gaseous phase.

The contaminant removing agent/contaminant mixture and the compressed and processed natural gas are then fed from the rotary screw compressor to a separator. In the separator, the contaminant removing agent/contaminant mixture is separated from the compressed and processed natural gas. The compressed and processed natural gas is recovered from the separator and may undergo further processing such as cooling and/or transportation to a gathering system or sales line. The contaminant removing agent/contaminant mixture is also recovered from the separator and may be further processed to recover the contaminant removing agent for reuse in the method.

The contaminant removing agent may be any compound which functions to remove a contaminant from the natural gas preferably by binding or associating with the contaminant. If the contaminant is water, the contaminant removing agent may be a dehydrating agent. Preferably, the dehydrating agent is glycol, and more preferably, diethylene glycol, triethylene glycol, tetraethlyene glycol, polyethylene glycol, polypropylene glycol, 1,3-butylene glycol, hexylene glycol, or any combination thereof. If the contaminant is carbon dioxide and/or hydrogen sulfide, the contaminant removing agent may be an amine, and more preferably, monoethanolamine (MEA) and/or diethanolamine (DEA).

If more than one contaminant is targeted, the contaminant removing agent could be a combination of a dehydrating agent (e.g., a glycol) and an agent that removes carbon dioxide and/or hydrogen sulfide (e.g., an amine) or any other combination of contaminant removing agents.

In the situation where the natural gas contains more than one contaminant or requires multiple processing to remove a contaminant, the method of the present invention may employ a series of rotary screw compressors to process the natural gas.

Natural gas containing a first contaminant and a second contaminant may be fed to a first rotary screw compressor where it comes into contact with a first contaminant removing agent being fed into the first rotary screw compressor. The first contaminant removing agent is mixed by the rotors of the rotary screw compressor with the natural gas containing the first and second contaminants and interacts and associates therewith. The rotary screw compressor compresses and processes the natural gas containing the first and second contaminants with the first contaminant removing agent to produce a combination of a first contaminant removing agent/first contaminant mixture in a liquid phase and a compressed and processed natural gas containing the second contaminant in a gaseous phase.

The first contaminant removing agent/first contaminant mixture and the compressed and processed natural gas containing the second contaminant are fed from the rotary screw compressor to a separator. The separator causes the separation of the first contaminant removing agent/first contaminant mixture from the compressed and processed natural gas containing the second contaminant.

The first contaminant removing agent/first contaminant mixture is recovered from the separator and may be subjected to further processing, as for example, processing to recover the first contaminant removing agent for reuse in the method.

The compressed and processed natural gas containing the second contaminant is fed from the separator to a second rotary screw compressor. A second contaminant removing agent is fed into the second rotary screw compressor. The operation or actuation of the rotors of the second rotary screw compressor causes the interaction, mixing, and association of the second contaminant removing agent with the compressed and processed natural gas containing the second contaminant.

The second rotary screw compressor also causes further compressing and processing of the compressed and processed natural gas containing the second contaminant with the second contaminant removing agent to produce a combination of a second contaminant removing agent/second contaminant mixture in a liquid phase and a further compressed and processed natural gas in a gaseous phase.

The second contaminant removing agent/second contaminant mixture and the further compressed and processed natural gas is fed from the second rotary screw compressor to a second separator. In the second separator, the second contaminant removing agent/second contaminant mixture is separated from the further compressed and processed natural gas. The further compressed and processed natural gas is recovered from the second separator and may be further processed by, for example, cooling the gas and/or transporting the gas to a gathering system or sales line. The second contaminant removing agent/second contaminant mixture is also recovered from the second separator and may be further processed in order to recover the second contaminant removing agent for reuse in the method.

The first contaminant removing agent may be a dehydrating agent (e.g., a glycol), an amine, or a combination of a dehydrating agent and an amine. The glycol may preferably be diethylene glycol, triethylene glycol, tetraethlyene glycol, polyethylene glycol, polypropylene glycol, 1,3-butylene glycol, hexylene glycol, or any combination thereof. The amine may preferably be monoethanolamine (MEA) and/or diethanolamine (DEA).

The second contaminant removing agent may also be a dehydrating agent (e.g., a glycol), an amine, or a combination of a dehydrating agent and an amine. The glycol may be diethylene glycol, triethylene glycol, tetraethlyene glycol, polyethylene glycol, polypropylene glycol, 1,3-butylene glycol, hexylene glycol, or any combination thereof. The amine may be monoethanolamine (MEA) and/or diethanolamine (DEA).

The methods of the present invention may be employed in the system of the present invention for compressing and dehydrating wet natural gas produced from a low-pressure well.

The system includes a first line feeding a hydrocarbon production obtained from a wellhead of a low-pressure well to an inlet scrubber. Because the hydrocarbon production may include not only wet natural gas, but also free liquid and/or solid contaminants, the inlet scrubber is operated to separate the free liquid and/or solid contaminants in the hydrocarbon production from the wet natural gas in the hydrocarbon production.

A second line feeds the wet natural gas from the inlet scrubber to the rotary screw compressor. A third line feeds a dehydrating agent from at least one dehydrating agent filter to the rotary screw compressor. As described above, the dehydrating agent associates and/or combines with the wet natural gas within the rotary screw compressor. The dehydrating agent may be a glycol and more preferably may be a glycol selected from the group consisting of diethylene glycol, triethylene glycol, tetraethlyene glycol, polyethylene glycol, polypropylene glycol, 1,3-butylene glycol, hexylene glycol, and/or any combination thereof.

An engine is operatively connected to and powers the rotary screw compressor to compress and dehydrate the wet natural gas as described above to produce a dehydrating agent/water mixture in a liquid phase and a compressed dry natural gas in a gaseous phase.

A fourth line feeds the dehydrating agent/water mixture and the compressed dry natural gas from the rotary screw compressor to a separator. The separator separates the dehydrating agent/water mixture from the compressed dry natural gas.

A fifth line feeds the compressed dry natural gas from the separator to a cooler. The cooler cools the compressed dry natural gas. A sixth line feeds the cooled compressed dry natural gas from the cooler to a gathering system or sales line.

A seventh line feeds the dehydrating agent/water mixture from the separator to a reboiler. The reboiler heats the dehydrating agent/water mixture to a temperature that causes vaporization of the water from the dehydrating agent/water mixture which results in the recovery of the dehydrating agent.

In a preferred embodiment of the system, the engine exhaust produced by the engine which powers the rotary screw compressor and the dehydrating agent pump is fed via an engine exhaust supply line from the engine to the reboiler. The reboiler preferably uses the engine exhaust to heat the dehydrating agent/water mixture, boil off the water, and recover the lean dehydrating agent.

An eighth line feeds the recovered dehydrating agent from the reboiler to a dehydrating agent pump. Preferably, the dehydrating agent pump is operatively connected to and powered by the same engine which powers the rotary screw compressor.

The dehydrating agent pump is responsible for pumping the dehydrating agent back up to pressure after it passes through the cooler to cause the dehydrating agent to be fed through the system to the rotary screw compressor. It is preferred if the dehydrating agent pump pumps or causes the recovered dehydrating agent to be fed from the reboiler to the rotary screw compressor through the eighth, ninth, tenth, and third lines.

A ninth line feeds the recovered dehydrating agent from the dehydrating agent pump to the cooler. The cooler cools the recovered dehydrating agent.

A tenth line feeds the cooled recovered dehydrating agent from the cooler to the at least one dehydrating agent filter. The dehydrating agent filter functions to filter the cooled recovered dehydrating agent to remove particulate matter before the cooled recovered dehydrating agent is fed through the third line back to the rotary screw compressor for reuse in the system.

The method of the present invention may also be used as part of a system to process natural gas containing one or more contaminants. Preferably, the system is used in a variety of facilities where natural gas is processed by contact, preferably, with a liquid. For example, the system of the present invention could be employed in gas processing plants, pipeline treating stations, or industrial fuel gas scrubber facilities.

In the system for processing a natural gas containing a contaminant, a first line feeds the natural gas containing the contaminant to a rotary screw compressor. A second line feeds a contaminant removing agent to the rotary screw compressor. The contaminant removing agent interacts, mixes, and associates with the natural gas containing the contaminant within said rotary screw compressor. Operation or actuation of the rotary screw compressor also compresses and processes the natural gas containing the contaminant to produce a combination of a contaminant removing agent/contaminant mixture in a liquid phase and a compressed and processed natural gas in a gaseous phase.

A third line feeds the contaminant removing agent/contaminant mixture and the compressed and processed natural gas from the rotary screw compressor to a separator. The separator separates the contaminant removing agent/contaminant mixture from the compressed and processed natural gas.

A fourth line feeds the compressed and processed natural gas from the separator for recovery thereof. The recovered compressed an processed natural gas may be further processed as for example by being cooled in a cooler and/or transported to a gather system or sales line. A fifth line feeds the contaminant removing agent/contaminant mixture from the separator for recovery thereof and further processing if desired in order to recover the contaminant removing agent for reuse in the system.

In an alternative system of the present invention, a natural gas containing a first contaminant and a second contaminant is fed by a first line to a rotary screw compressor. A second line feeds a first contaminant removing agent to the rotary screw compressor. The first contaminant removing agent associates with the natural gas containing the first and second contaminants within the rotary screw compressor. Operation or actuation of the rotary screw compressor compresses and processes the natural gas containing the first and second contaminants to produce a combination of a first contaminant removing agent/first contaminant mixture in a liquid phase and a compressed and processed natural gas containing the second contaminant in a gaseous phase.

A third line feeds the first contaminant removing agent/first contaminant mixture and the compressed and processed natural gas containing the second contaminant from the rotary screw compressor to a separator. The separator separates the first contaminant removing agent/first contaminant mixture from the compressed and processed natural gas containing the second contaminant. A fourth line feeds the first contaminant removing agent/first contaminant mixture from the separator for recovery thereof and further processing if necessary, as for example, processing to recover the first contaminant removing agent for reuse in the system.

A fifth line feeds the compressed and processed natural gas containing the second contaminant from the separator to a second rotary screw processor. A sixth line feeds a second contaminant removing agent to the second rotary screw compressor. The second contaminant removing agent interacts, mixes, and associates with the compressed and processed natural gas containing the second contaminant within the second rotary screw compressor. Operation or actuation of the second rotary screw compressor further compresses and processes the compressed and processed natural gas containing the second contaminant to produce a mixture including a second contaminant removing agent/second contaminant mixture in a liquid phase and a further compressed and processed natural gas in a gaseous phase.

A seventh line feeds the combination of a second contaminant removing agent/second contaminant mixture and the further compressed and processed natural gas from the second rotary screw compressor to a second separator. The second separator separates the second contaminant removing agent/second contaminant mixture from the further compressed and processed natural gas. An eighth line feeds the second contaminant removing agent/second contaminant mixture from the second separator for recovery thereof and additional processing in order to recover the second contaminant removing agent for reuse in the system. A ninth line feeds the further compressed and processed natural gas from the second separator for recovery thereof and further processing if necessary, e.g., cooling in a cooler and/or transported to a gathering system or sales line.

It can be appreciated that the alternative system has two stages. The first stage is preferably implemented to remove one particular contaminant such as water from the natural gas. Therefore, the first contaminant removing agent preferably used in the first stage is a dehydrating agent such as a glycol. The glycol is preferably diethylene glycol, triethylene glycol, tetraethlyene glycol, polyethylene glycol, polypropylene glycol, 1,3-butylene glycol, hexylene glycol, or any combination thereof.

The second stage of the system is designed to remove another contaminant such as carbon dioxide and/or hydrogen sulfide from the natural gas. Therefore, in the second stage, it is preferable to use an amine as the second contaminant removing agent. Preferably, the amine is monoethanolamine (MEA) and/or diethanolamine (DEA).

The objects and advantages of the present invention including those mentioned above and others will be readily apparent to one skilled in the art to which the invention pertains from a perusal of the claims and the following detailed description of preferred embodiments when read in conjunction with the appended drawings.

DESCRIPTION OF PREFERRED EMBODIMENTS OF THE INVENTION

Figure 1:
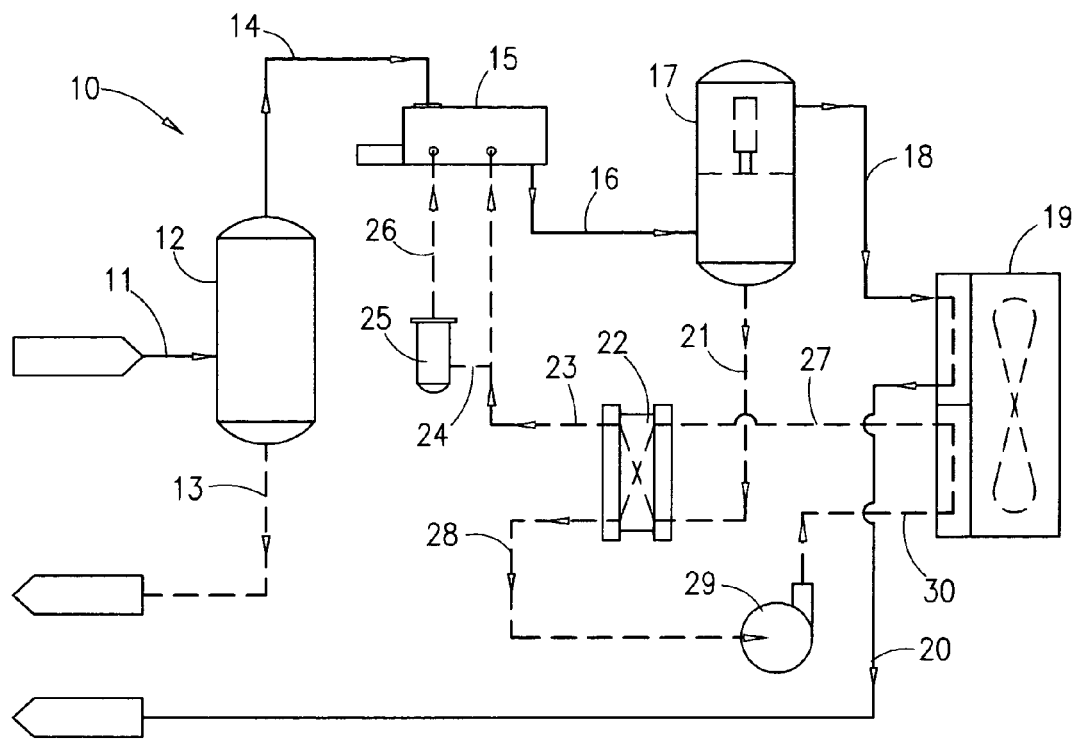
FIG. 1 is a prior art schematic illustration of a rotary compression system for natural gas.
Figure 2:
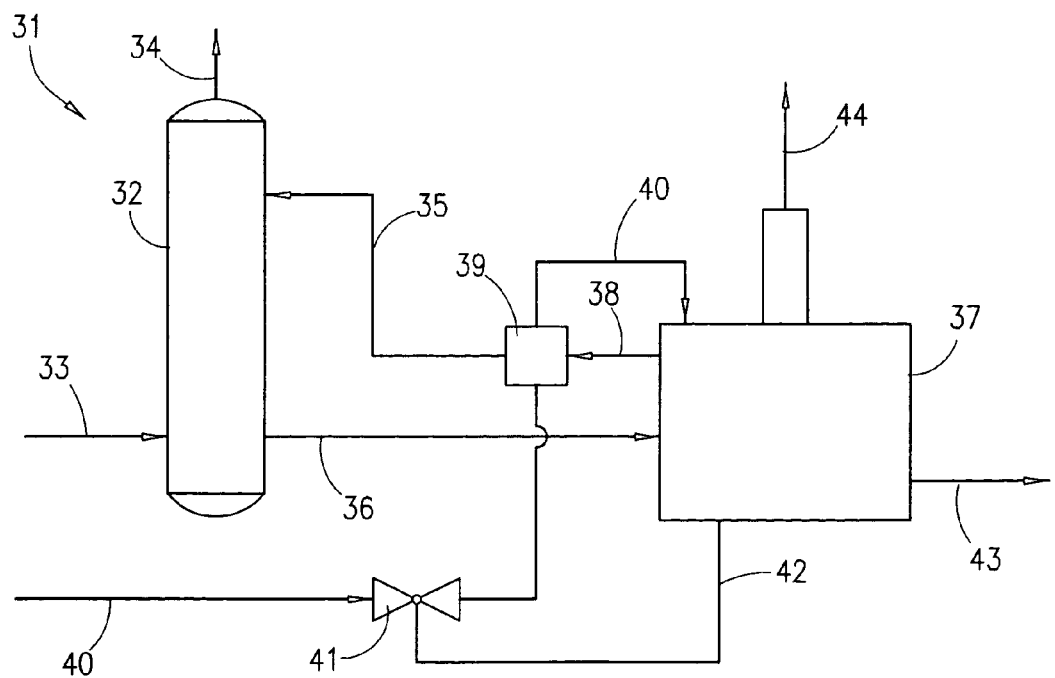
FIG. 2 is a prior art schematic illustration of a conventional dehydrating system for natural gas.
Figure 3:
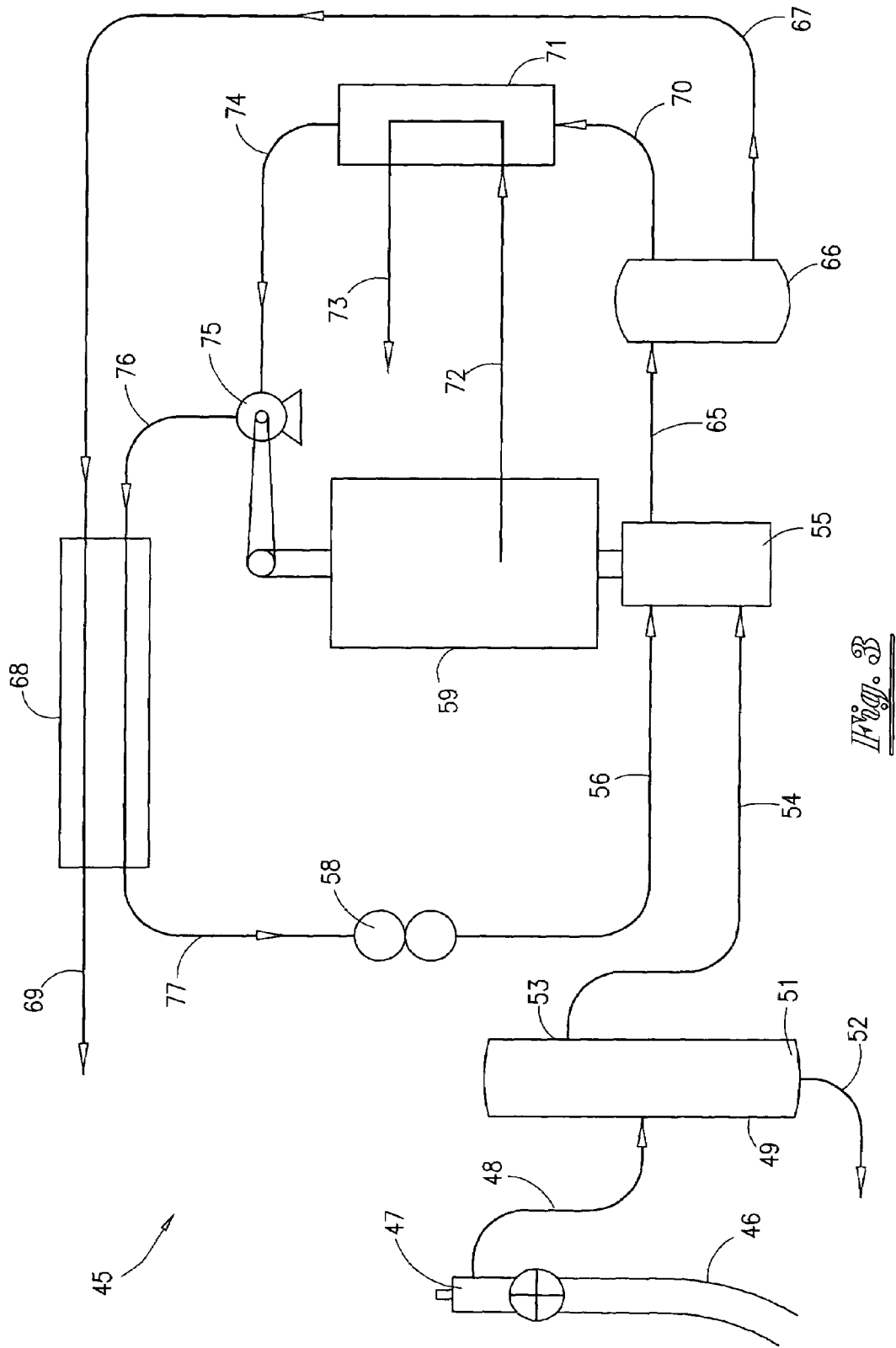
FIG. 3 is a schematic illustration of the method of the present invention for compressing and dehydrating wet natural gas.
Figure 4:
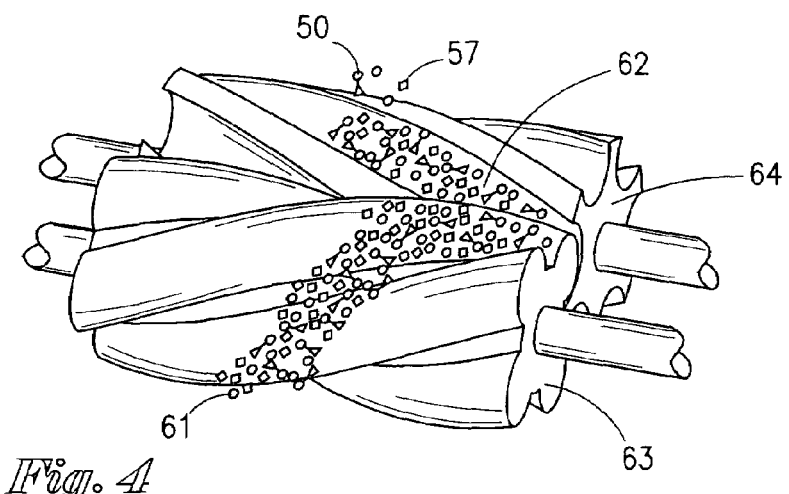
FIG. 4 is a perspective view of twin helical rotors of a rotary screw compressor in the initial stage of compressing and dehydrating wet natural gas in accordance with the method and system of the present invention.

With reference to the figures where like elements have been given like numerical designation to facilitate an understanding of the present invention, and particularly with reference to the embodiment of the compression and dehydration system 45 of the present invention illustrated in FIGS. 3-10, a hydrocarbon production produced from low-pressure well 46 is fed from wellhead 47 through line 48 to inlet scrubber 49. Inlet scrubber 49 may be a conventional scrubber apparatus for removing free liquid and solid contaminants from a natural gas stream. The hydrocarbon production is passed up through inlet scrubber 49 which separates wet natural gas 50 from any free liquid and/or solid contaminants in the hydrocarbon production. The liquid and/or solid contaminants settle at the bottom portion 51 of inlet scrubber 49 and are discharged therefrom via line 52 for disposal.

Wet natural gas 50 passes from upper portion 53 of inlet scrubber 49 through line 54 to rotary screw compressor 55. Line 56 feeds dehydrating agent 57 from dehydrating agent filter 58 to rotary screw compressor 55. Rotary screw compressor 55 may be any conventional rotary screw compressor.

It is to be understood that line 56 could be in fluid communication with line 54 so that dehydrating agent 57 is fed into line 56 where dehydrating agent 57 and wet natural gas 50 are combined. Dehydrating agent 57 and wet natural gas 50 would then be fed to rotary screw compressor 55 via line 54.

Dehydrating agent 57 associates with wet natural gas 50 within rotary screw compressor 55 and absorbs water vapor present in wet natural gas 50. Dehydrating agent 57 may be a glycol and more preferably may be a glycol selected from the group consisting of diethylene glycol, triethylene glycol, tetraethlyene glycol, polyethylene glycol, polypropylene glycol, 1,3-butylene glycol, hexylene glycol, and/or any combination thereof.

The amount of dehydrating agent 57 that is fed into rotary screw compressor 55 in order to dehydrate wet natural gas 50 depends upon the flow rate, cooling requirement, and water vapor content of wet natural gas 50.

If dehydrating agent 57 is a glycol, dehydrating agent 57 may also act as a lubricant to lube and seal the moving parts of rotary screw compressor 55 and to cool rotary screw compressor 55 during compression.

Engine 59 is operatively connected to and powers rotary screw compressor 55. Engine 59 is a conventional natural gas or electric internal combustion engine. Operation of rotary screw compressor 55 compresses and dehydrates wet natural gas 50 to produce dehydrating agent/water mixture 60 in a liquid phase and compressed dry natural gas 61 in a gaseous phase.

The process of compression and dehydration is shown in FIG. 4-10. Wet natural gas 50 and dehydrating agent 57 are present together within flute 62 of female rotor 64 at the initial compression stage. As rotors 63, 64 rotate the volume of flute 62 decreases thus compressing wet natural gas 50 and dehydrating agent 57.

Figure 5:
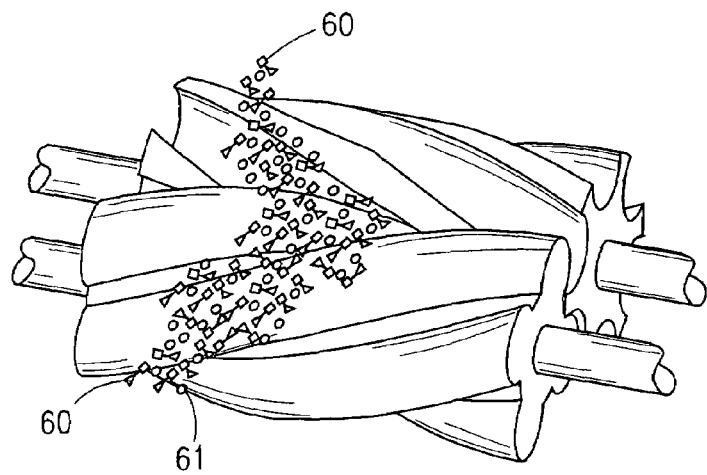
FIG. 5 is a perspective view of twin helical rotors of a rotary screw compressor in the interim stage of compressing and dehydrating wet natural gas in accordance with the method and system of the present invention.
Figure 6:
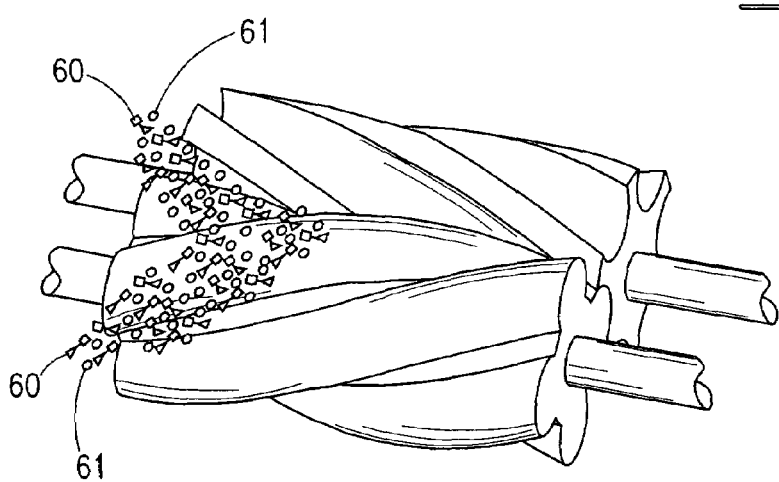
FIG. 6 is a perspective view of twin helical rotors of a rotary screw compressor in the discharge stage of compressing and dehydrating wet natural gas in accordance with the method and system of the present invention.
Figure 7:
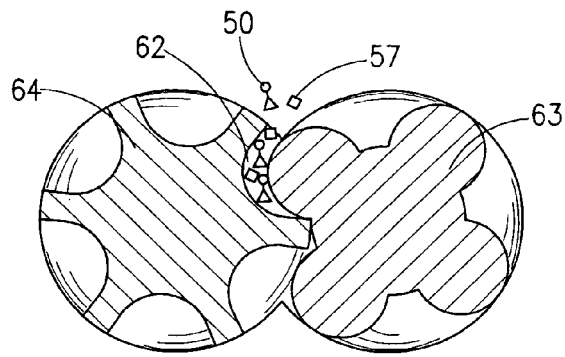
FIG. 7 is cross-sectional view of the meshing of the twin helical rotors of the rotary screw compressor in the pre-discharge stage of compression and dehydration of wet natural gas in accordance with the method and system of the present invention.
Figure 8:
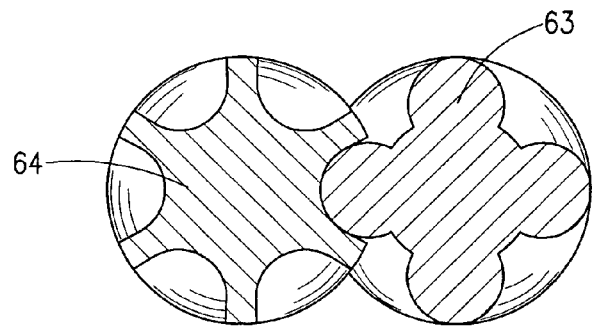
FIG. 8 is cross-sectional view of the meshing of the twin helical rotors of the rotary screw compressor in the initial discharge stage of compression and dehydration of wet natural gas in accordance with the method and system of the present invention.
Figure 9:
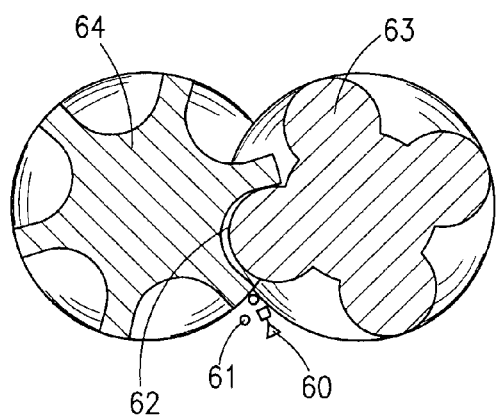
FIG. 9 is cross-sectional view of the meshing of the twin helical rotors of the rotary screw compressor in the interim discharge stage of compression and dehydration of wet natural gas in accordance with the method and system of the present invention.
Figure 10:
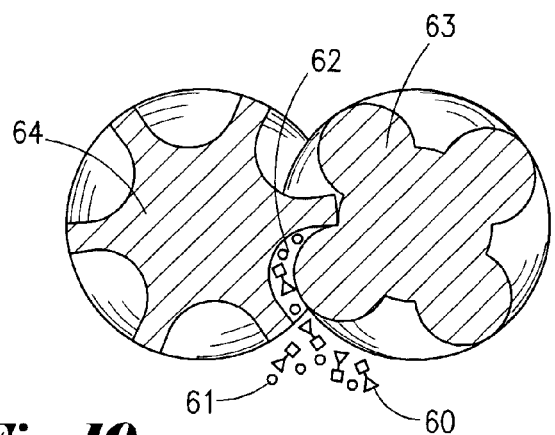
FIG. 10 is cross-sectional view of the meshing of the twin helical rotors of the rotary screw compressor in the latter discharge stage of compression and dehydration of wet natural gas in accordance with the method and system of the present invention.

As shown in FIGS. 5 and 6, the compression process is capable of causing sufficient intermixing and contacting of wet natural gas 50 and dehydrating agent 57 such that dehydrating agent 57 absorbs water vapor present in wet natural gas 50 to produce dehydrating agent/water mixture 60 in liquid phase. With the removal of water vapor, wet natural gas 50 is dried and becomes compressed dry natural gas 61 in gaseous phase. FIGS. 7-10 show the discharge of compressed dry natural gas 61 and dehydrating agent/water mixture 60 from rotors 63, 64.

Again with reference to FIGS. 3-6, line 65 feeds dehydrating agent/water mixture 60 and compressed dry natural gas 61 from rotary screw compressor 55 to separator 66. Separator 66 separates dehydrating agent/water mixture 60 from compressed dry natural gas 61. Separator 66 may be a conventional oil or glycol separator.

Line 67 feeds compressed dry natural gas 61 from separator 66 to cooler 68. Cooler 68 cools compressed dry natural gas 61 preferably to a temperature of about 100° F. or lower. Cooler 68 may be a conventional air cooler or heat exchanger or a conventional glycol/water fed cooler or heat exchanger. Line 69 feeds cooled compressed dry natural gas 61 from cooler 68 to a gathering system or sales line (not shown).

Line 70 feeds dehydrating agent/water mixture 60 from separator 66 to reboiler 71. Reboiler 71 heats dehydrating agent/water mixture 60 to a temperature that causes vaporization of water from dehydrating agent/water mixture 60 which results in the recovery of dehydrating agent 57. Vaporization of water within reboiler 71 occurs at a temperature range of 275-300° F.

Engine exhaust produced by engine 59 when powering rotary screw compressor 55 is fed via engine exhaust supply line 72 engine 59 to reboiler 71. Reboiler 71 uses the engine exhaust to heat dehydrating agent/water mixture 60 and recover dehydrating agent 57. Reboiler 71 is a standard reboiler which uses exhaust from engine 59 as a heat source. Reboiler 71 may be of a fire tube, U-shaped design having a diameter large enough to permit the unrestricted flow of exhaust produced by engine 59 and still provide enough area for the heating of dehydrating agent/water mixture 60.

The water vaporized in reboiler 71 is vented through vent line 73 to the atmosphere. Line 74 feeds recovered dehydrating agent 57 from reboiler 71 to dehydrating agent pump 75. Preferably, dehydrating agent pump 75 is operatively connected to and powered by engine 59, which powers rotary screw processor 55. Dehydrating agent pump 75 is responsible for pumping dehydrating agent 57 back up to pressure so that dehydrating agent 57 can be fed through the system to rotary screw compressor 55.

Line 76 feeds recovered dehydrating agent 57 from dehydrating agent pump 75 to cooler 68. Cooler 68 cools recovered dehydrating agent 57. Preferably, recovered dehydrating agent 57 is cooled to a temperature of around 80° F.

Line 77 feeds cooled recovered dehydrating agent 57 from cooler 68 to dehydrating agent filter 58. Dehydrating agent filter 58 may be any conventional glycol filter. Two or more dehydrating agent filters 58 may be used to filter cooled recovered dehydrating agent 57. Dehydrating agent filter 58 filters cooled recovered dehydrating agent 57 and thereby removes particulate matter and decreases the particle size of recovered dehydrating agent 57 before it is fed through line 56 back to rotary screw compressor 55 for reuse in system 45. Dehydrating agent 57 may be filtered to a particle size in the range of 5 to 50 microns to remove particulate matter.

Figure 11:
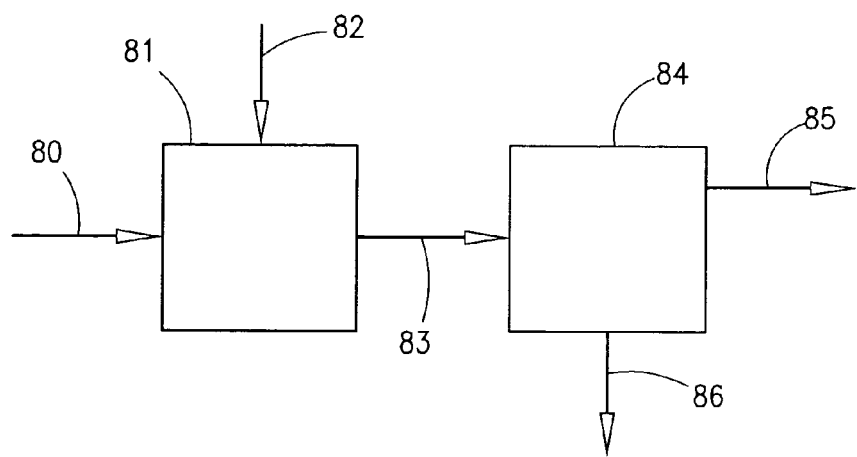
FIG. 11 is a schematic illustration of the system of the present invention for processing natural gas containing a contaminant.
Figure 12:
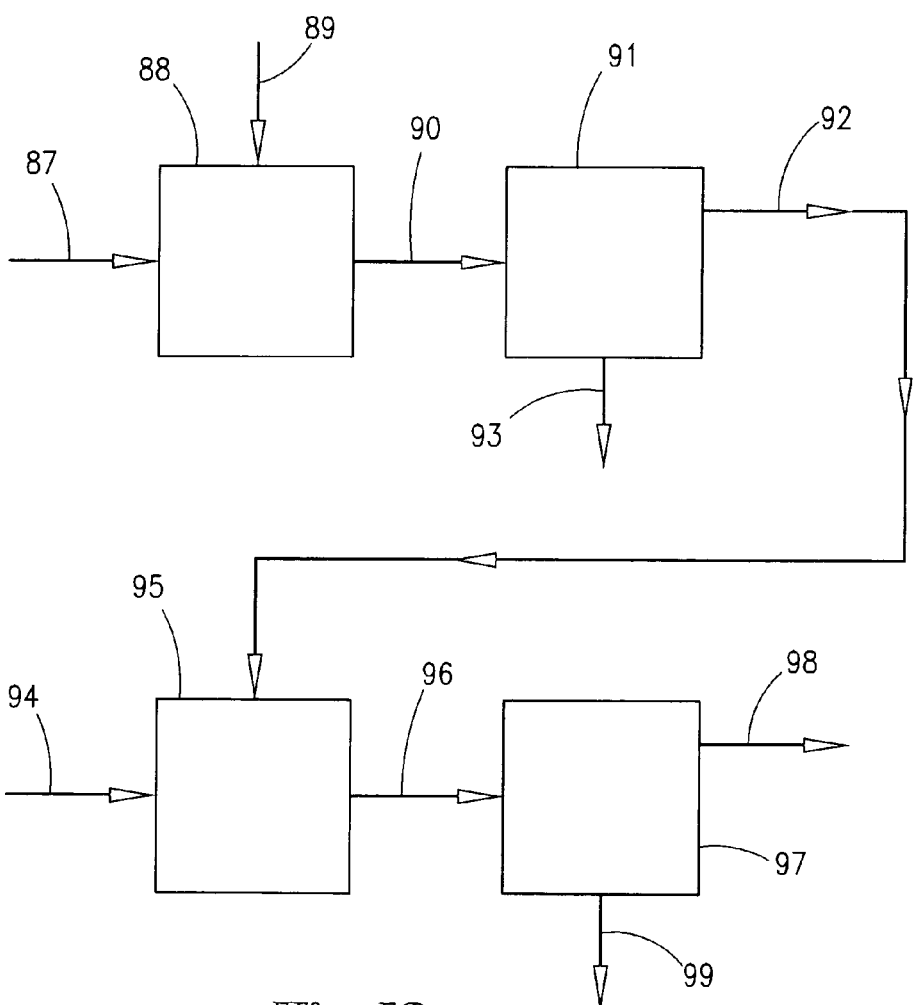
FIG. 12 is a schematic illustration of the system of the present invention for processing natural gas containing more than one contaminant.

FIGS. 11 and 12 show alternative embodiments of the system for processing natural gas containing one or more contaminants which have application in a variety of facilities such as gas processing plants, pipeline treating stations, and industrial fuel scrubber facilities.

With reference to FIG. 11, line 82 feeds a natural gas containing a contaminant to rotary screw compressor 81. While the natural gas containing the contaminant is being fed into rotary screw compressor 81, line 80 feeds a contaminant removing agent into rotary screw compressor 81.

The contaminant removing agent can be any compound (preferably a liquid) which functions to remove the contaminant from the natural gas. For example, if the contaminant is water, the contaminant removing agent may be a dehydrating agent. Preferably, the dehydrating agent is a glycol. More preferably, the glycol is diethylene glycol, triethylene glycol, tetraethlyene glycol, polyethylene glycol, polypropylene glycol, 1,3-butylene glycol, hexylene glycol, and/or any combination thereof.

If the contaminant is carbon dioxide and/or hydrogen sulfide, the contaminant removing agent is preferably an amine, and more preferably monoethanolamine (MEA) and/or diethanolamine (DEA).

Alternatively, the contaminant removing agent could be a combination of a dehydrating agent (e.g., glycol) and an amine in which case it may function to remove more than one contaminant.

The amount of the contaminant removing agent to be fed into rotary screw compressor 81 in order to remove the contaminant from the natural gas depends on the specific contaminant to be removed, and other variables (e.g., flow rate, contaminant content, etc.) which are well within the skill of the ordinary artisan The operation or actuation of rotary screw compressor 81 causes the mixing and association of the natural gas containing the contaminant with the contaminant removing agent resulting in the production of a combination in which the contaminant removing agent/contaminant in a liquid phase and a compressed and processed natural gas in a gaseous phase. The contaminant removing agent is a compound that attracts and chemically binds the contaminant thereby disassociating the contaminant from the natural gas as part of the processing procedure.

The contaminant removing agent/contaminant mixture and the compressed and processed natural gas is then fed by line 83 to separator 84. In separator 84, the compressed and processed natural gas is separated from the contaminant removing agent/contaminant mixture and fed through line 85 to equipment where it may be cooled and/or transported to a gathering system or sales line. The contaminant removing agent/contaminant mixture is fed through line 86 where it may undergo processing to recover the contaminant removing agent which may be reused in the process.

FIG. 12 shows an alternative system of the present invention in which a series of rotary screw compressors 88 and 95 are operatively connected. Line 89 feeds a natural gas containing a first contaminant and a second contaminant into rotary screw compressor 88. Meanwhile, line 87 feeds a first contaminant removing agent into rotary screw compressor 88. Operation or actuation of rotary screw compressor 88 causes the mixture and association of the natural gas containing the first and second contaminants with the first contaminant removing agent. Such mixing and association causes the production of a mixture or combination including the first contaminant removing agent/first contaminant mixture and a compressed and processed natural gas containing the second contaminant. The forces generated by the rotary action of screw compressor 88 cause the first contaminant removing agent to react with the first contaminant. Such reaction causes the first contaminant to associate or bind with the first contaminant removing agent thereby disassociating the first contaminant from the natural gas leaving the natural gas in association with the second contaminant only.

After processing in rotary screw compressor 88, line 90 feeds the first contaminant removing agent/first contaminant mixture and the natural gas containing the second contaminant to separator 91. In separator 91, the compressed and processed natural gas containing the second contaminant is separated from the first contaminant removing agent/first contaminant mixture and is fed through line 92 for introduction into rotary screw compressor 95. Line 93 feeds the first contaminant removing agent/first contaminant mixture from separator 91 where the mixture is further processed to recover the first removing agent which may be reused in the process.

Also with reference to FIG. 12, line 94 feeds a second contaminant removing agent into rotary screw compressor 95 for processing with the compressed and processed natural gas containing the second contaminant. The operation or actuation of rotary screw compressor 95 causes the compressed and processed natural gas containing the second contaminant to mix and associate with the second contaminant removing agent. Such mixing and association causes the second contaminant to react with the second contaminant removing agent and bind thereto. This results in the production of a combination of a second contaminant removing agent/second contaminant mixture in liquid phase and a further compressed and processed natural gas in a gaseous phase.

The second contaminant removing agent/second contaminant mixture and the further compressed and processed natural gas are fed by line 96 to separator 97. In separator 97, the further compressed and processed natural gas is separated from the second contaminant removing agent/second contaminant mixture and is fed through line 98 to cooling equipment and/or transported to a gathering system or sales line. Line 93 feeds the first contaminant removing agent/first contaminant mixture from separator 91 where the mixture is further processed to recover the first removing agent which may be reused in the process.

The first contaminant removing agent and second contaminant removing agent are preferably in liquid form. The contaminant removing agents may be any agent or compound which function to remove a contaminant from the natural gas.

If the contaminant is water, first and second contaminant removing agents may each be a dehydrating agent. Preferably, the dehydrating agent is a glycol and more preferably, diethylene glycol, triethylene glycol, tetraethlyene glycol, polyethylene glycol, polypropylene glycol, 1,3-butylene glycol, hexylene glycol, or any combination thereof.

If the contaminant is carbon dioxide and/or hydrogen sulfide, the first and second contaminant removing agents may each be an amine and more preferably monoethanolamine (MEA), diethanolamine (DEA), or any combination thereof.

It is preferred that the first contaminant removing agent be a dehydrating agent which functions to remove water from the natural gas and that the second contaminant removing agent be an amine which functions to remove carbon dioxide and/or hydrogen sulfide from the natural gas. However, the first contaminant removing agent could be an amine and the second contaminant removing agent could be a dehydrating agent.

It is also possible for the first and second contaminant removing agents to be the same, e.g., a dehydrating agent or an agent which removes carbon dioxide and/or hydrogen sulfide. In this situation, the natural gas is being further processed by rotary screw compressor 95 to remove any residual water or carbon dioxide and/or hydrogen sulfide in the natural gas after being processed by rotary screw 88.

It should also be understood that first and second contaminant removing agents could each be a combination of a dehydrating agent (e.g., glycol) and an agent which removes carbon dioxide and/or hydrogen sulfide (e.g., an amine), in which case they each would function to remove water, $CO_2$ and $H_2S$ from the natural gas.

While FIG. 12 only show two systems of the present invention in an operational series, the present invention may employ more than two systems in an operational series in order to accomplish the processing of the natural gas.

There are numerous benefits obtained by the method and system of the present invention. For example, the present invention eliminates costs associated with the purchase, operation, and maintenance of gas/liquid contact towers, which equipment is not required under the present invention. Contact towers are a major expense in any gas processing facility. The present invention eliminates the need for such towers by using the rotary screw compressor as the source for contact and interaction between the gas and processing liquid (e.g., contaminant removing agent). Moreover, in high Delta P gas treating operations, a two stage rotary screw compressor can be used in the present invention for running glycol as a dehydrating agent in the first stage and amines for CO2 and H2S removal in the second stage. The present invention is also applicable in high Delta P situations using higher horsepower drivers, and in lower Delta P situations (where compression is not necessary) using low horsepower drivers. In low Delta P application, the rotary screw compressor is acting as contact apparatus only (as a mixer) and therefore the screw design can be modified to save costs.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a perusal hereof.

What is claimed is:

1. A method of processing a natural gas containing a contaminant comprising the steps of:
   a) feeding said natural gas containing said contaminant to a rotary screw compressor;
   b) feeding a contaminant removing agent to said rotary screw compressor and permitting said contaminant removing agent to associate with said natural gas containing said contaminant within said rotary screw compressor;
   c) causing said rotary screw compressor to compress and process said natural gas containing said contaminant with said contaminant removing agent to produce a combination of a contaminant removing agent/contaminant mixture in a liquid phase and a compressed and processed natural gas in a gaseous phase;
   d) feeding said combination of said contaminant removing agent/contaminant mixture and said compressed and processed natural gas from said rotary screw compressor to a separator;
   e) causing said separator to separate said contaminant removing agent/contaminant mixture from said compressed and processed natural gas;
   f) recovering said compressed and processed natural gas from said separator;
   g) recovering said contaminant removing agent/contaminant mixture from said separator.

2. The method according to claim 1, wherein said contaminant removing agent is selected from the group consisting of a glycol, an amine, and a combination of said glycol and said amine.

3. The method according to claim 2, wherein said glycol is selected from the group consisting of diethylene glycol, triethylene glycol, tetraethlyene glycol, polyethylene glycol, polypropylene glycol, 1,3-butylene glycol, hexylene glycol, and any combination thereof.

4. The method according to claim 2, wherein said amine is selected from the group consisting of monoethanolamine (MBA), diethanolamine (DEA), and any combination thereof.

5. A method of processing a natural gas containing a first contaminant and a second contaminant comprising the steps of:
   a) feeding said natural gas containing said first and second contaminants to a rotary screw compressor;
   b) feeding a first contaminant removing agent to said rotary screw compressor and permitting said first contaminant removing agent to associate with said natural gas containing said first and second contaminants within said rotary screw compressor;
   c) causing said rotary screw compressor to compress and process said natural gas containing said first and second contaminants with said first contaminant removing agent to produce a combination of a first contaminant removing agent/first contaminant mixture in a liquid phase and a compressed and processed natural gas containing said second contaminant in a gaseous phase;
   d) feeding said combination of said first contaminant removing agent/first contaminant mixture and said compressed and processed natural gas containing said second contaminant from said rotary screw compressor to a separator;
   e) causing said separator to separate said first contaminant removing agent/first contaminant mixture from said compressed and processed natural gas containing said second contaminant;
   f) recovering said first contaminant removing agent/first contaminant mixture from said separator;
   g) feeding said compressed and processed natural gas containing said second contaminant from said separator to a second rotary screw compressor;
   h) feeding a second contaminant removing agent to said second rotary screw compressor and permitting said second contaminant removing agent to associate with said compressed and processed natural gas containing said second contaminant within said second rotary screw compressor;
   i) causing said second rotary screw compressor to further compress and process said compressed and processed natural gas containing said second contaminant with said second contaminant removing agent to produce a combination of a second contaminant removing agent/second contaminant mixture in a liquid phase and a further compressed and processed natural gas in a gaseous phase;
   j) feeding said combination of said second contaminant removing agent/second contaminant mixture and said further compressed and processed natural gas from said second rotary screw compressor to a second separator;
   k) causing said second separator to separate said second contaminant removing agent/second contaminant mixture from said further compressed and processed natural gas;
   l) recovering said further compressed and processed natural gas from said second separator;
   m) recovering said second contaminant removing agent/second contaminant mixture from said second separator.

6. The method according to claim 5, wherein said first contaminant removing agent is selected from the group consisting of a glycol, an amine, and a combination of said glycol and said amine.

7. The method according to claim 6, wherein said glycol is selected from the group consisting of diethylene glycol, triethylene glycol, tetraethlyene glycol, polyethylene glycol, polypropylene glycol, 1,3-butylene glycol, hexylene glycol, and any combination thereof.

8. The method according to claim 6, wherein said amine is selected from the group consisting of monoethanolamine (MEA), diethanolamine (DEA), and any combination thereof.

9. The method according to claim 5, wherein said second contaminant removing agent is selected from the group consisting of a glycol, an amine, and a combination of said glycol and said amine.

10. The method according to claim 9, wherein said glycol is selected from the group consisting of diethylene glycol, triethylene glycol, tetraethlyene glycol, polyethylene glycol, polypropylene glycol, 1,3-butylene glycol, hexylene glycol, and any combination thereof.

11. The method according to claim 9, wherein said amine is selected from the group consisting of monoethanolamine (MEA), diethanolamine (DEA), and any combination thereof.

12. A system for processing a natural gas containing a contaminant comprising:
   a first line feeding said natural gas containing said contaminant to a rotary screw compressor;
   a second line feeding a contaminant removing agent to said rotary screw compressor, said contaminant removing agent associating with said natural gas containing said contaminant within said rotary screw compressor;
   wherein actuation of said rotary screw compressor compresses and processes said natural gas containing said contaminant to produce a combination of a contaminant removing agent/contaminant mixture in a liquid phase and a compressed and processed natural gas in a gaseous phase;
   a third line feeding said combination of said contaminant removing agent/contaminant mixture and said compressed and processed natural gas from said rotary screw compressor to a separator, said separator separating said contaminant removing agent/contaminant mixture from said compressed and processed natural gas;
   a fourth line feeding said compressed and processed natural gas from said separator for recovery thereof;
   a fifth line feeding said contaminant removing agent/contaminant mixture from said separator for recovery thereof.

13. The system according to claim 12, wherein said contaminant removing agent is selected from the group consisting of a glycol, an amine, and a combination of said glycol and said amine.

14. The system according to claim 13, wherein said glycol is selected from the group consisting of diethylene glycol, triethylene glycol, tetraethlyene glycol, polyethylene glycol, polypropylene glycol, 1,3-butylene glycol, hexylene glycol, and any combination thereof.

15. The system according to claim 13, wherein said amine is selected from the group consisting of monoethanolamine (MEA), diethanolamine (DEA), and any combination thereof.

16. A system for processing a natural gas containing a first contaminant and a second contaminant comprising:
   a first line feeding said natural gas containing said first and second contaminants to a rotary screw compressor;
   a second line feeding a first contaminant removing agent to said rotary screw compressor, said first contaminant removing agent associating with said natural gas containing said first and second contaminants within said rotary screw compressor;
   wherein actuation of said rotary screw compressor compresses and processes said natural gas containing said first and second contaminants to produce a combination of a first contaminant removing agent/first contaminant mixture in a liquid phase and a compressed and processed natural gas containing said second contaminant in a gaseous phase;
   a third line feeding said combination of said first contaminant removing agent/first contaminant mixture and said compressed and processed natural gas containing said second contaminant from said rotary screw compressor to a separator, said separator separating said first contaminant removing agent/first contaminant mixture from said compressed and processed natural gas containing said second contaminant;
   a fourth line feeding said first contaminant removing agent/first contaminant mixture from said separator for recovery thereof;
   a fifth line feeding said compressed and processed natural gas containing said second contaminant from said separator to a second rotary screw processor; a sixth line feeding a second contaminant removing agent to said second rotary screw compressor, said second contaminant removing agent associating with said compressed and processed natural gas containing said second contaminant within said second rotary screw compressor;
   wherein actuation of said second rotary screw compressor further compresses and processes said compressed and processed natural gas containing said second contaminant to produce a combination of a second contaminant removing agent/second contaminant mixture in a liquid phase and a further compressed and processed natural gas in a gaseous phase;
   a seventh line feeding said combination of said second contaminant removing agent/second contaminant mixture and said further compressed and processed natural gas from said second rotary screw compressor to a second separator, said second separator separating said second contaminant removing agent/second contaminant mixture from said further compressed and processed natural gas;
   an eighth line feeding said second contaminant removing agent/second contaminant mixture from said second separator for recovery thereof;
   a ninth line feeding said further compressed and processed natural gas from said second separator for recovery thereof.

17. The system according to claim 16, wherein said first contaminant removing agent is selected from the group consisting of a glycol, an amine, and a combination of said glycol and said amine.

18. The system according to claim 17, wherein said glycol is selected from the group consisting of diethylene glycol, triethylene glycol, tetraethlyene glycol, polyethylene glycol, polypropylene glycol, 1,3-butylene glycol, hexylene glycol, and any combination thereof.

19. The system according to claim 17, wherein said amine is selected from the group consisting of monoethanolamine (MEA), diethanolamine (DEA), and any combination thereof.

20. The system according to claim 16, wherein said second contaminant removing agent is selected from the group consisting of a glycol, an amine, and a combination of said glycol and said amine.

21. The system according to claim 20, wherein said glycol is selected from the group consisting of diethylene glycol, triethylene glycol, tetraethlyene glycol, polyethylene glycol, polypropylene glycol, 1,3-butylene glycol, hexylene glycol, and any combination thereof.

22. The system according to claim 20, wherein said amine is selected from the group consisting of monoethanolamine (MEA), diethanolamine (DEA), and any combination thereof.

* * * * *